UNITED STATES PATENT OFFICE.

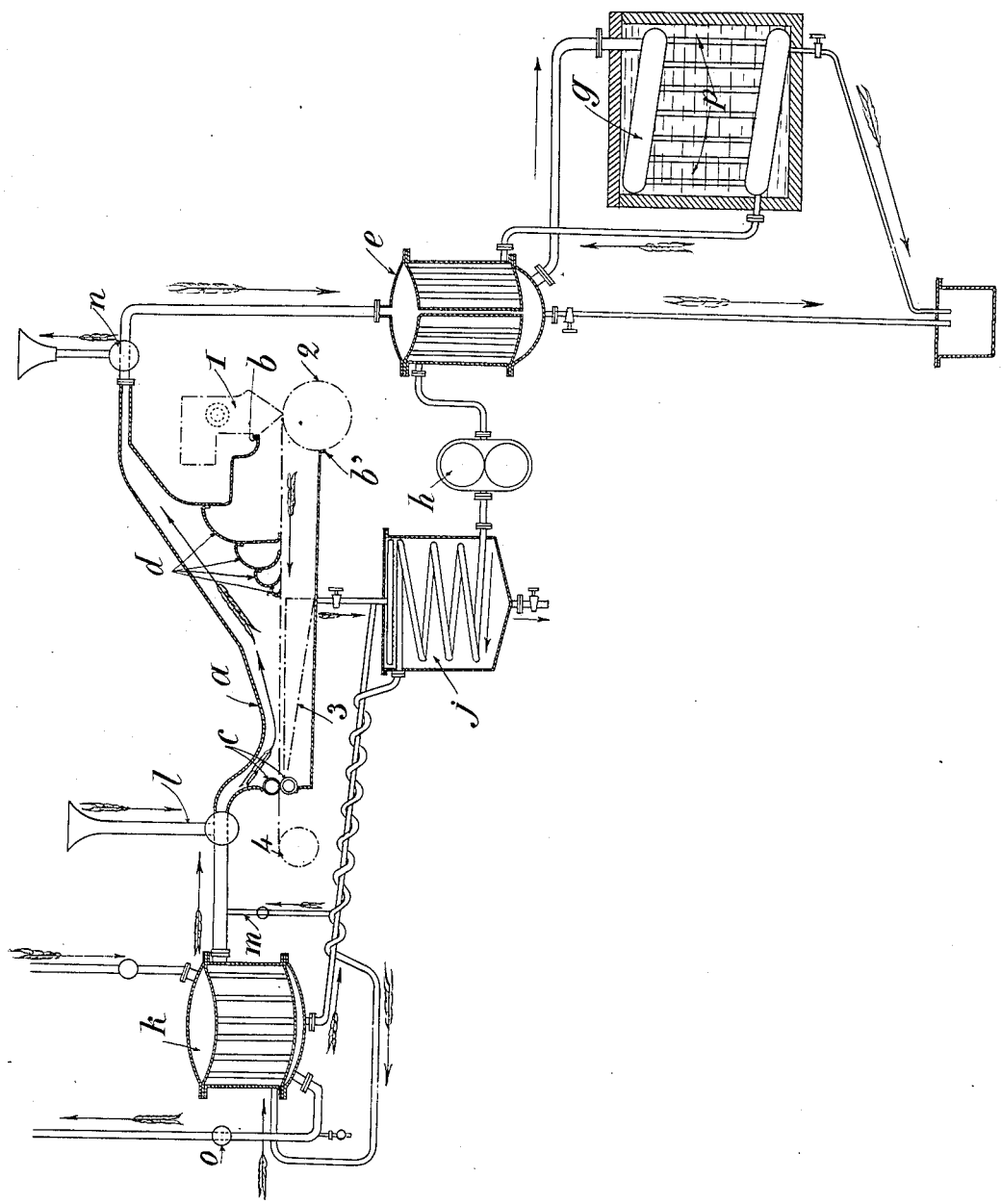

AMÉDÉE ETIENNE VINCENT, OF PARIS, FRANCE.

APPARATUS FOR RECOVERING BENZIN, &c.

No. 849,645.	Specification of Letters Patent.	Patented April 9, 1907.

Application filed July 2, 1906. Serial No. 324,417.

*To all whom it may concern:*

Be it known that I, AMÉDÉE ETIENNE VINCENT, civil engineer, a citizen of France, residing at 40 Rue Condorcet, Paris, France, have invented new and useful Improvements in Apparatus for Recovering Benzin and other Volatile Products Which are Freed During Certain Industrial Operations, of which the following is a specification.

This invention relates to apparatus for recovering benzin and other volatile products which are freed during certain industrial operations, and more particularly during the drying of the gummed canvas prepared in the india-rubber manufacture.

The vapors that are freed are gathered in a closed bell into which passes a superheated current of air which absorbs and carries away said vapors in a closed circuit comprising, essentially, a condenser in which the vapors to be recovered are condensed, a superheater in which the air charged with vapors not yet condensed is heated before passing again into the bell, so as to follow continuously the same way under the action of a fan, and the whole is arranged in such a manner that the pipe-sections in which the cold mixture issuing from the condenser circulates come into contact before said mixture passes to the superheater with the pipe-sections in which the hot mixture issuing from the bell circulates. By this means a complete recovering of the volatile products is obtained in a very economical manner, the vapors carried away repassing continuously by the condenser and being subjected each time to the changes of temperature until they have been entirely condensed. The air employed is heated, as mentioned, to augment its drying as well as its absorbing power.

The heating of the purified mass is assured in one or several heaters, of which one at least will be capable of employing the heat generally lost contained in the hot waters issued from the steam condensations after work has taken place in the various apparatus of the installation. Thus a part of the heating is obtained free of any cost.

The condensation is obtained in a condenser of any kind.

The exchange of temperature between the hot parts and the cold parts of the pipe system will generally take place in an apparatus called an "exchanger of temperatures" and into which will pass the pipe leading from the condenser to the superheater. This exchanger of temperatures thus inserted in the circuit will furnish a part of the heat necessary to heat the purified air and will assure at the same time a cooling of the hot mixture issuing from the bell, which will determine a partial condensation of the vapors to be recovered. Finally, the circulation of the fluid mixture in the closed circuit will be assured, as stated, by a fan or pump which will at the same time allow of regulating the speed of said circulation.

The annexed drawing represents an installation of apparatus for recovering benzin, toluene, and like vapors which are freed during the drying of the canvas freshly gummed in the india-rubber manufacture.

1 represents the gum-distributer of the gumming-machine; 2, the canvas-holding drum; 3, the heating-table upon which passes the freshly-gummed canvas to be dried; 4, the cylinder receiving the canvas dried by the table. This table, which is hollow, is heated by steam, the calories of which are absorbed for a large part by the drying of the canvas. In the actual installations the heating is effected by the common air, the freed benzin vapors spreading in the atmosphere of the factory, which is dangerous, and, besides, these vapors are entirely lost.

According to this invention the heating-table is placed in a gathering-bell *a*, closed as hermetically as possible to avoid as far as possible any introduction of the outside air under the bell and any escape of benzin vapor from the bell outside. For this purpose the bell abuts against the articulated distributer of the gumming-machine, a felted joint being, besides, provided at *b*. Such a joint is also provided iunder the canvas between the bell and the distributing-roller at *b'*. At the other end of the bell, to obturate the slot required for the outlet of the canvas, a roller-joint *c c* is employed. For the same purpose a zone is provided in the bell, limited at the side of the fluid current by curved sheet-plates *d*, adapted to break the speed of the air-current, which would eventually enter under the bell if the joints were not tight. In this security zone the gas mixture is almost at rest and constitutes by itself a sort of elastic cushion which avoids losses through the bell as well as any introduction from outside.

The discharge-orifice of the bell is connected to the temperature-exchanger *e*. This apparatus, which is shown diagrammatically merely for indication sake, comprises, essentially, two distinct receivers, like an ordinary surface condenser. One of the receivers belongs to the pipe of the hot gaseous mass and the other to the return-pipe for the cold air more or less purified. To obtain the maximum effect with the said temperature-exchanger, the fluid currents are of course issued in opposite directions and the largest surface possible is given to the common walls which serve for the exchange. This exchanger presents, as mentioned, a double advantage. It allows, first, the gratuitous condensation of a part of the benzin vapors and heats, on the other hand, the cold purified air, (condensing agent,) the temperature of which is too low to permit its direct returning to the gathering-belt. The exchanger realizes thus a double economy in the costs of the recovery. The gaseous mass to be heated passes then to the condenser $g$, where it is further purified by abandoning after a further fall of the temperature a fresh quantity of liquid benzin. The condenser can be placed, for instance, in the freezing-tank $p$ of any frigorific apparatus.

At the outlet of the condenser the cold purified air passes into the second chamber of the exchanger, where its temperature rises. It is then sucked in by the fan or pump $h$, which forces it into a first heater $j$, fed by hot water issuing from the steam condensations of the factory generally lost. As shown in the drawing, it is advisable to employ the hot water issuing from the steam condensations in the heating-table. The discharge hot water of the different vapor-superheaters can also be employed by means of the arrangement shown in the drawing. It is to be remarked that, the caloric energy employed in the first heater $j$ being thus furnished by hot water generally lost in the factories, it is quite free of costs. This is the second step of the heating, the first being constituted by the exchanger. The air arriving from the first heater $j$ can then either be sent back to the bell, if its temperature is judged to be high enough, or it can be forced to a second heater $k$, fed, for instance, by a steam-pipe of the factory.

The installation is completed by a pipe $l$ for the entrance of atmospheric air. This pipe is connected to the main pipe by a two-way cock. Another two-way cock $n$, mounted on the discharge-pipe of the bell, allows of discharging to the common air in case of need. The installation comprises, finally, besides the ordinary controlling and measuring apparatus, a valve system which permits of isolating all or part of the closed circuit and putting in or out of the circuit one or several apparatus. Thus, for instance, the pipe $m$ with a valve allows of isolating at will the heater $k$.

It will be useful in this installation to employ heat-isolating substances wherever it will be desirable to avoid losses of heat, and, namely, around the gathering-bell, on the inlet-pipe next to the bell, around the cooling-tank $p$, and other apparatus.

It will be understood that in an installation of the kind described all the remanent benzin vapor is brought back to the bell with the volume of air. An entire theoretical recovering of the benzin vapors is hence assured by the drying under the bell, the escape being practically unimportant in a good installation. Besides, the cost of the calorific energy, which constitutes a great part of the expenses for the recovering proper, is reduced to a minimum by the temperature-exchanger, by the condensers, and by the heaters. The mass of air serving as the carrying medium for the vapors is also reduced to a minimum by causing said air to work with a great variation of temperature. By overheating the air before it enters the bell its absorbing property is considerably increased. By the cooling the purifying degree that is desired can be obtained by carrying on the condensation as far as possible.

When the normal regime is assured, the work is effected with constant variations of volumes, pressures, and temperatures, the maximum and minimum limits of said volumes, pressures, and temperatures being determined once for all and being constant during all the period of the work.

Having now described my invention, what I claim as new, and desire to secure by Letters Patent, is—

1. In an installation for recovering benzin and other volatile products which are freed during certain industrial operations, the combination of a hollow heating-table 3 upon which passes the substance to be treated, a gathering-bell $a$ hermetically closed and surrounding the heating-table, a temperature-exchanger $e$, means for leading the gaseous mixture issuing from the gathering-bell into said exchanger, a condenser $g$ connected to the temperature-exchanger, a fan or pump $h$ adapted to suck the purified air from the temperature-exchanger, and a heater $j$ connected with the pump and into which passes the air sucked from the temperature-exchanger, and connected to the gathering-bell, substantially as described and for the purpose set forth.

2. In an installation for recovering benzin and other volatile products which are freed during certain industrial operations, the combination of a hollow heating-table 3 heated by steam and upon which passes the substance to be treated, a gathering-bell $a$ hermetically closed and surrounding the heating-table, a temperature-exchanger $e$ connected with the bell $a$ and into which leads the gaseous mixture issuing from the gathering-bell, a condenser $g$ connected to the temperature-exchanger, a fan or pump $h$ adapted to suck the purified air from the temperature-exchanger, a first heater $j$ connected with the pump and into which passes the air sucked from the temperature-exchanger, a second heater $k$ connected to the first heater and to the gathering-bell, a pipe system and valves therein for putting the heater $k$ into or out of the closed circuit.

3. In an installation for recovering benzin and other volatile products which are freed during the drying of the gummed canvas prepared in the india-rubber manufacture, the combination of a gum-distributer 1, a canvas-distributing drum 2, a heating-table 3 upon which passes the gummed canvas, a gathering-bell $a$ hermetically closed against the gum-distributer and the canvas-distributing drum, curved sheet-plates $d$ arranged within the bell and adapted to break the speed of the air-current, a roller-tight joint $c\ c$ for the outlet of the gummed canvas from the gathering-bell, a temperature-exchanger $e$ connected with the bell and into which leads the gaseous mixture issuing from the gathering-bell, a condenser $g$ connected to the temperature-exchanger, a fan or pump $h$ adapted to suck the purified air from the temperature-exchanger, a first heater $j$ connected with the pump and into which passes the air sucked from the temperature-exchanger, a second heater $k$ connected to the first heater and to the gathering-bell, a pipe system with suitable valves allowing to put into or out of the closed circuit the second heater $k$, and pipes provided with two-way cocks leading respectively to the inlet and outlet pipes of the gathering-bell, substantially as described and for the purpose set forth.

In testimony whereof I have signed my name to this specification in the presence of two subscribing witnesses.

AMÉDÉE ETIENNE VINCENT.

Witnesses:
  LOUIS MOSES,
  HANSON C. COXE.